(12) United States Patent
Koh et al.

(10) Patent No.: US 10,465,593 B2
(45) Date of Patent: Nov. 5, 2019

(54) COOLANT CONTROL VALVE

(71) Applicants: HYUNDAI MOTOR COMPANY, Seoul (KR); KIA MOTORS CORPORATION, Seoul (KR)

(72) Inventors: Won Hyuk Koh, Seoul (KR); Hyun Wook Ryu, Hwaseong-si (KR); Byung Chul Lee, Suwon-si (KR); Seok Jun Yoon, Anyang-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 15/830,359

(22) Filed: Dec. 4, 2017

(65) Prior Publication Data

US 2018/0171860 A1 Jun. 21, 2018

(30) Foreign Application Priority Data

Dec. 16, 2016 (KR) .......................... 10-2016-0172187

(51) Int. Cl.
| | |
|---|---|
| *F01P 7/14* | (2006.01) |
| *F16K 31/524* | (2006.01) |
| *F16K 31/52* | (2006.01) |
| *F16K 11/16* | (2006.01) |

(52) U.S. Cl.
CPC .............. *F01P 7/14* (2013.01); *F16K 11/165* (2013.01); *F16K 31/52* (2013.01); *F16K 31/52408* (2013.01); *F16K 31/52416* (2013.01); *F01P 2007/146* (2013.01)

(58) Field of Classification Search
CPC .......... F01P 7/14; F16K 11/165; F16K 31/52; F16K 31/52408; F16K 31/522416
See application file for complete search history.

(56) References Cited

U.S. PATENT DOCUMENTS

| | | | | |
|---|---|---|---|---|
| 1,185,516 | A * | 5/1916 | MacVicar | ................. F01L 1/30 123/188.2 |
| 2,607,598 | A * | 8/1952 | Mack | ..................... F16K 11/165 137/616.7 |
| 2,855,152 | A * | 10/1958 | Tyler | .................. B60H 1/00485 236/99 G |
| 2,925,091 | A * | 2/1960 | Speisman | ............. F01D 17/145 137/312 |

(Continued)

FOREIGN PATENT DOCUMENTS

| | | |
|---|---|---|
| EP | 1484205 A2 | 12/2004 |
| JP | H02-55810 A | 2/1990 |

(Continued)

*Primary Examiner* — Eric Keasel
*Assistant Examiner* — Kevin R Barss
(74) *Attorney, Agent, or Firm* — Morgan, Lewis & Bockius LLP

(57) ABSTRACT

A coolant control valve includes a cam rotating by rotational force; a pivot arm disposed under the cam, one end of the pivot arm moving in an up and down direction by rotation of the cam; a valve installed at another end of the pivot arm and disposed outside an outer diameter of the cam, the valve moving as the pivot arm moves; and a pivot arm support hinge for supporting the pivot arm and enabling vertical movement of the pivot arm when the cam rotates.

6 Claims, 5 Drawing Sheets

(56) References Cited

U.S. PATENT DOCUMENTS

| | | | | |
|---|---|---|---|---|
| 3,174,324 | A | * | 3/1965 | Ostertag ................. F16K 31/52 251/263 |
| 4,044,996 | A | * | 8/1977 | Kodaira ................. F16K 31/52 251/229 |
| 8,316,809 | B1 | | 11/2012 | Patterson et al. |

FOREIGN PATENT DOCUMENTS

| | | |
|---|---|---|
| JP | 2013-517416 A | 5/2013 |
| KR | 1995-0019219 U | 7/1995 |
| KR | 20-0192286 Y1 | 8/2000 |
| KR | 20-0289789 Y1 | 9/2002 |
| KR | 10-0914678 B1 | 8/2009 |
| KR | 10-1592428 B1 | 2/2016 |
| KR | 10-1628236 B1 | 6/2016 |
| WO | 2004/083607 A2 | 9/2004 |

\* cited by examiner

COOLANT CONTROL VALVE

CROSS-REFERENCE(S) TO RELATED APPLICATION

This application claims under 35 U.S.C. § 119(a) the benefit of priority to Korean Patent Application No. 10-2016-0172187 filed on Dec. 16, 2016, the entire content of which is incorporated herein by reference.

TECHNICAL FIELD

The present disclosure relates to a coolant control valve, and more particularly, to a coolant control valve capable of stabilizing a vertical movement of a valve body and preventing leakage.

BACKGROUND

Generally, engines generate rotational force by combustion of fuel, and the remainder of the combustion energy is discharged as heat energy.

Particularly, cooling water absorbs heat energy while it circulates through an engine, a heater, and a radiator and discharges the heat energy to the outside.

When temperature of the cooling water of the engine is low, there is a tendency that viscosity of lubricating oil increases and hence friction force increases, resulting in increase of fuel consumption and that temperature of exhaust gas rises slowly. Thus, it takes a relatively long period of time for activating a catalyst, resulting in deterioration of quality of the exhaust gas.

In addition, time for normalization of function of the heater becomes longer and hence a driver and passengers can feel cold.

On the contrary, if the temperature of the cooling water of the engine is excessively high, knocking occurs. However, if an ignition timing is adjusted to suppress the knocking, performance may be deteriorated.

Moreover, if the temperature of the lubricating oil is excessively high, lubricating action may be deteriorated.

Therefore, there may be applied a single cooling water control valve that controls a plurality of cooling components by means of a single valve, for example, in a manner that a temperature of the cooling water in a specific portion of the engine is kept high and temperatures of the other portions are kept low.

However, the cooling water control valve is formed such that a rotating cam 1 pushes a valve 2 and allows the valve 2 to tilt and move up and down, as shown in FIG. 1. This cooling water control valve has a problem of leakage which occurs by a gap allowing the tilting movement and the valve 2 may be damaged by a shear force due to the tilting movement.

The above information disclosed in this Background section is only for enhancement of understanding of the background of the invention, and therefore, it may contain information that does not form the prior art that is already known in this country to a person of ordinary skill in the art.

SUMMARY OF THE DISCLOSURE

The present disclosure is directed to a coolant control valve in which a pivot arm and a pivot arm support hinge are disposed between a cam and a valve, thus eliminating a shear force acting on the valve by the cam and at the same time increasing length of a valve guide so as to install the valve outside an outer diameter of the cam so that it is possible to stabilize behavior of vertical movement of the valve and improve leakage.

According to one aspect of the present disclosure, a coolant control valve comprises: a cam rotating by rotational force; a pivot arm disposed under the cam, one end of the pivot arm moving in an up and down direction by the rotation of the cam; a valve installed at another end of the pivot arm and disposed outside an outer diameter of the cam, the valve moving as the pivot arm moves; and a pivot arm support hinge supporting the pivot arm and enabling the up and down movement of the pivot arm when the cam rotates.

The coolant control valve further comprises a valve guide disposed to be spaced apart from a lower portion of the pivot arm wherein the valve guide is configured to allow the valve to pass through the inside thereof to guide a path of lifting and descending of the valve.

The pivot arm comprises a body, a protrusion protruding from a top portion of the body and abut against a slant surface of a slope at a lower surface of the cam, and a guide rod formed on a lower portion of the body to guide movement of position of the valve wherein a plurality of pivot arms are disposed below the cam.

The body comprises a mounting groove formed to allow the pivot arm support hinge to be inserted therein wherein the mounting groove guides up and down movement of the pivot arm against the pivot arm support hinge when the protrusion is pressed by rotation of the cam.

The mounting groove is formed in a round shape corresponding to shape of the pivot arm support hinge and provided such that an upper part of the pivot arm support hinge is fitted into and engaged with the mounting groove to allow the body to rotate pivotally.

At least one pivot arm is arranged radially under the cam and the slope presses the protrusion through the slant surface thereof and forces one end of the body to descend as the cam rotates.

The valve guide comprises an installation guide formed on one side of a plate such that the valve is positioned outside the outer diameter of the cam and the up and down movement of the valve is supported; and a lip seal installed inside the installation guide to interrupt formation of a gap between an inner surface of the installation guide and an outer surface of the valve.

The present disclosure has an advantageous effect that since the pivot arm and the pivot arm support hinge are provided between the cam and the valve so as to eliminate a shear force acting on the valve by the cam and at the same time length of the valve guide is increased so as to install the valve outside the outer diameter of the cam, it is possible to stabilize behavior of vertical movement of the valve and improve leakage.

In addition, the present disclosure has a further advantageous effect that since the valve is configured to follow the valve guide and move in the vertical direction only, it is possible to stabilize behavior of movement of the valve and eliminate the shear force applied to the valve as described above, thereby improving breakdown of the valve.

Moreover, the present disclosure has also an advantageous effect that since lengths of the pivot arm, the valve guide and the like can be adjusted such that the valve is installed outside the outer diameter of the cam, the degree of freedom of design according to a valve layout can be increased.

Other aspects and preferred embodiments of the invention are discussed infra.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The above and other features of the invention are discussed infra.

BRIEF DESCRIPTION OF THE DRAWINGS

The above and other features of the present disclosure will now be described in detail with reference to certain exemplary embodiments thereof illustrated the accompanying drawings which are given hereinbelow by way of illustration only, and thus are not limitative of the present disclosure, and wherein.

Figure 1:
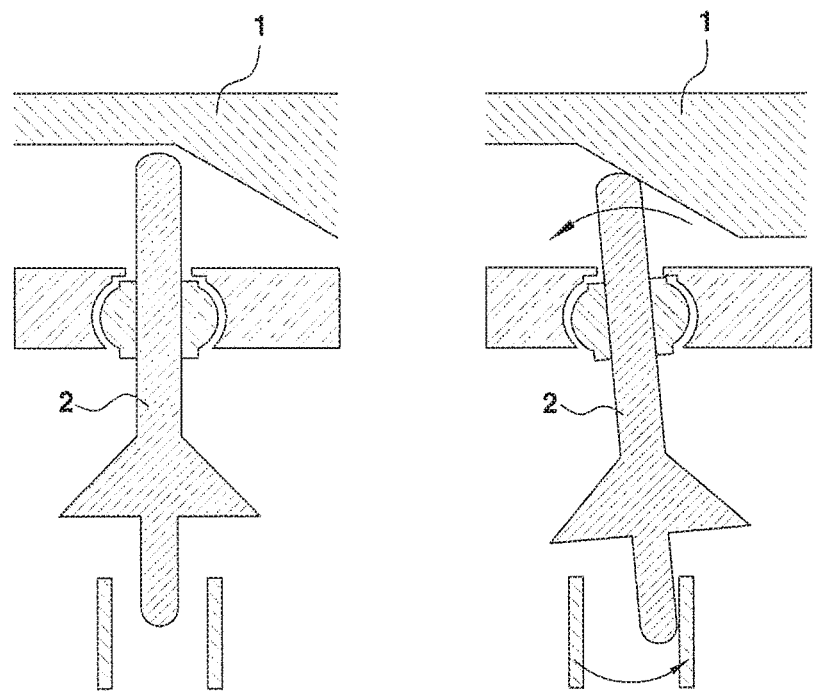
FIG. 1 is a schematic view of a conventional coolant control valve.

It should be understood that the appended drawings are not necessarily to scale, presenting a somewhat simplified representation of various features illustrative of the basic principles of the invention. The specific design features of the present disclosure as disclosed herein, including, for example, specific dimensions, orientations, locations, and shapes will be determined in part by the particular intended application and use environment.

In the figures, reference numbers refer to the same or equivalent parts of the present disclosure throughout the several figures of the drawing.

DETAILED DESCRIPTION

Exemplary embodiments of the present disclosure will now be described in detail with reference to the accompanying drawings.

Advantages and features of the present disclosure and methods of achieving the same will be clearly understood from exemplary embodiments described in detail below with reference to the accompanying drawings.

However, the present disclosure is not limited to the exemplary embodiments described below, but can be implemented in various ways. The exemplary embodiments are provided to make the present disclosure clear and to help those skilled in the art completely understand the scope of the present disclosure. Therefore, the present disclosure is defined only by the scope of the claims.

In addition, in the following description, detailed explanation of known related arts and the like may be omitted to avoid unnecessarily obscuring the subject matter of the present disclosure.

Figure 2:
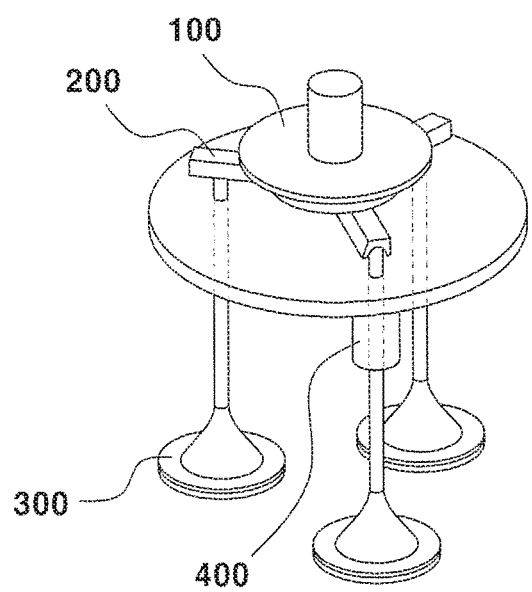
FIG. 2 is a schematic view showing a state of installation of a coolant control valve according to an embodiment of the present disclosure.
Figure 3:
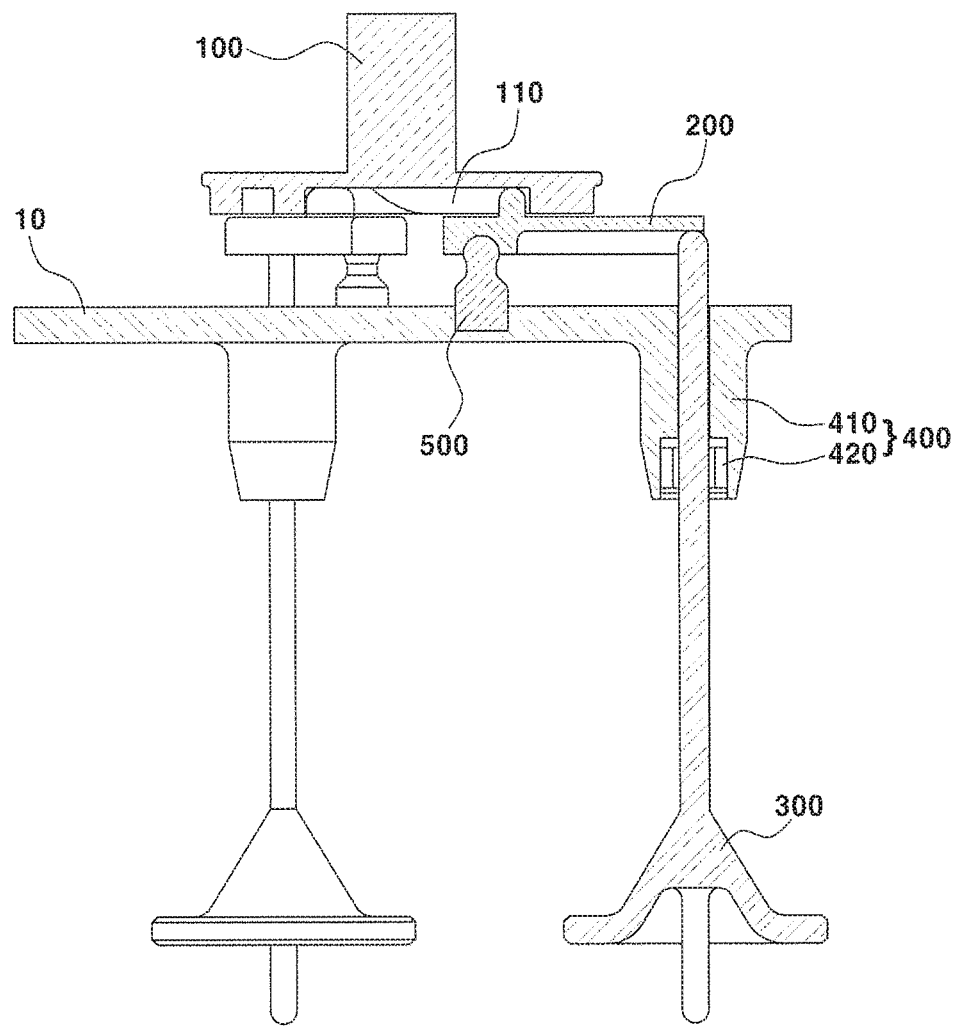
FIG. 3 is a view showing a coolant control valve according to an embodiment of the present disclosure.

FIG. 2 is a view schematically showing a state of installation of a coolant control valve according to an embodiment of the present disclosure, and FIG. 3 is a view showing a coolant control valve according to an embodiment of the present disclosure.

Figure 4:
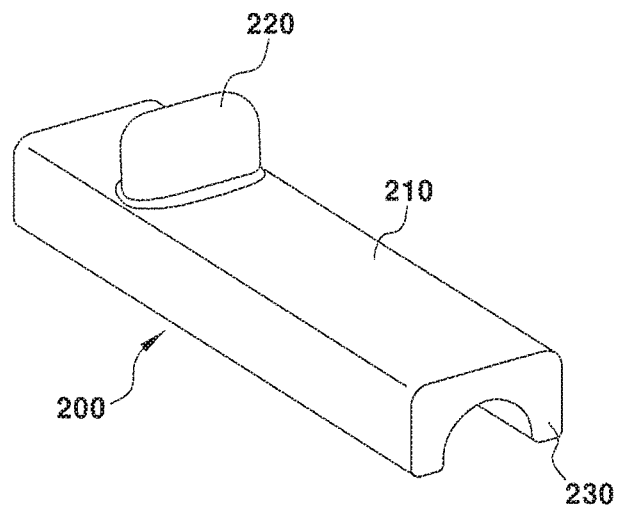
FIG. 4 is a view showing a pivot arm of a coolant control valve according to an embodiment of the present disclosure.
Figure 5:
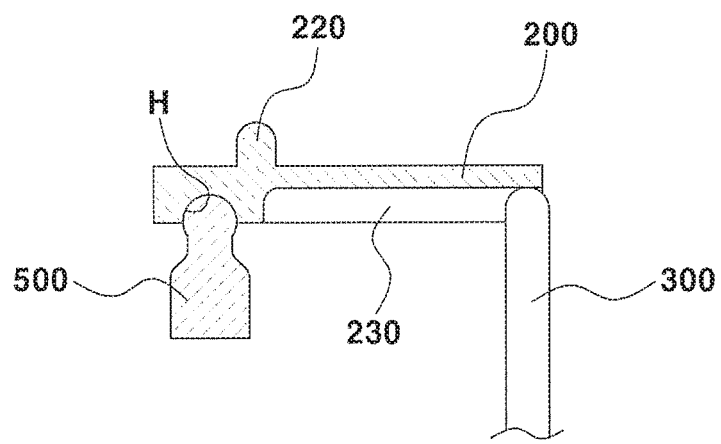
FIG. 5 is a view showing installation of a pivot arm support hinge and a valve body of a coolant control valve according to an embodiment of the present disclosure.

Further, FIG. 4 is a view showing a pivot arm of a coolant control valve according to an embodiment of the present disclosure, and FIG. 5 is a view showing installation of a pivot arm support hinge and a valve body of a coolant control valve according to an embodiment of the present disclosure.

As shown in FIGS. 2 and 3, a coolant control valve according to this embodiment comprises a cam part 100, a pivot arm part 200, a valve part 300 and a valve guide 400.

First, the cam part 100 is provided to enable driving of the valve part wherein the cam part receives rotational force generated by a driving means (not shown) and rotates, thereby allowing the pivot arm part 200 to operate.

This pivot arm part 200 is disposed under the cam part 100 and rotate pivotally as the cam part 100 rotates, whereby one end part thereof lifts and descends along a vertical direction.

The pivot arm part 200 is herein to enable lifting and descending of the valve part 300 by lifting and descending as described above. To this end, the pivot arm part 200 comprises a body part 210, a protrusion 220 and a guide rod 230 as shown in FIG. 4.

A plurality of body parts 210, each of which has a predetermined length, are disposed under the cam part 100 in a manner that they protrude from the outside of an outer diameter of the cam part 100.

In addition, the body part 210 is also provided with a mounting groove H which is formed on a lower portion of the body part 210 so as to be spaced apart from the guide rod 230 and which is intended to guide position of mounting a pivot arm support hinge 500 enabling pivotal rotation of the body part 210 when a protrusion 220 is pressed by rotation of the cam part 100.

In this case, the mounting groove H is formed in a round shape corresponding to shape of the pivot arm support hinge 500 as shown in FIG. 5, whereby an upper part of the pivot arm support hinge 500 having the same shape as the mounting groove H is fitted into and engaged with the mounting groove.

The protrusion 220 is formed to protrude from a top portion of the body part 210 and contact with a slant surface of a slope 110 on a lower surface of the cam part 100.

That is, the protrusion 220 protrudes at a position corresponding to the slope 110 provided on the lower surface of the cam part 100 wherein when it is pressed through the slant surface of the slope 110 as the cam part 100 rotates, it transmits pressing force to the body part 210 so that the body part 210 can move up and down about the pivot arm support hinge 500.

The guide rod 230 has a predetermined length as shown in FIG. 5 and is formed in a groove shape on the lower portion of the body part 210 to guide movement of the valve part 300.

Further, an inner portion of the guide rod 230 may be formed in a circular shape such that when the valve part 300 is installed in the guide rod, frictional force at a region where the valve part contacts with the valve part 300 is minimized.

Moreover, the guide rod 230 may be formed in a shape of a lock guide enabling an outer peripheral surface of the valve part 300 to be pressed therein such that the valve part 300 installed in the guide rod cannot be broken away from the guide rod.

The valve part 300 is installed at one end of the pivot arm part 200 to move up and down as the pivot arm 200 moves up and down.

In other words, the valve part 300 is provided for controlling a flow rate wherein it is installed in a manner of penetrating a valve guide 400 and adapted to descend and selectively block a flow path when the pivot arm part 200, i.e., the body part 210 of the pivot arm part 200 pivots.

The valve guide 400 is disposed to be spaced apart from the lower portion of the pivot arm part 200 and is connected to one end of the pivot arm part 200 disposed to be spaced apart from the valve guide by means of the pivot arm support hinge 500 enabling pivotal rotation of the pivot arm part 200, thereby guiding path of lifting and descending of the valve part 300.

The valve guide 400 includes an installation guide 410 and a lip seal 420.

The installation guide 410 is formed on one side of a plate 10 and supports lifting and descending of the valve part 300.

In addition, the installation guide 410 has a predetermined length at a lower portion of the plate 10 and is configured to allow the valve part 300 to pass through and insert into the inside thereof, thereby guiding the path of lifting and descending of the valve part 300.

Accordingly, since the installation guide 410 has a predetermined length, the valve part 300 is allowed to pass through the inside of installation guide and stably move along a vertical direction, so that behavior of the valve part 300 is stabilized and a shear force that may be applied to the valve part 300 is eliminated, thereby improving damage of the valve part 300.

The lip seal 420 is installed inside the installation guide 410 to interrupt formation of a gap between an inner surface of the installation guide 410 and an outer surface of the valve part 300 moving up and down.

That is, the lip seal 420 is made of an elastic material such as rubber, and can avoid a possibility of further leakage by interrupting in advance a gap that may be formed inside the installation guide 410.

Figure 6:
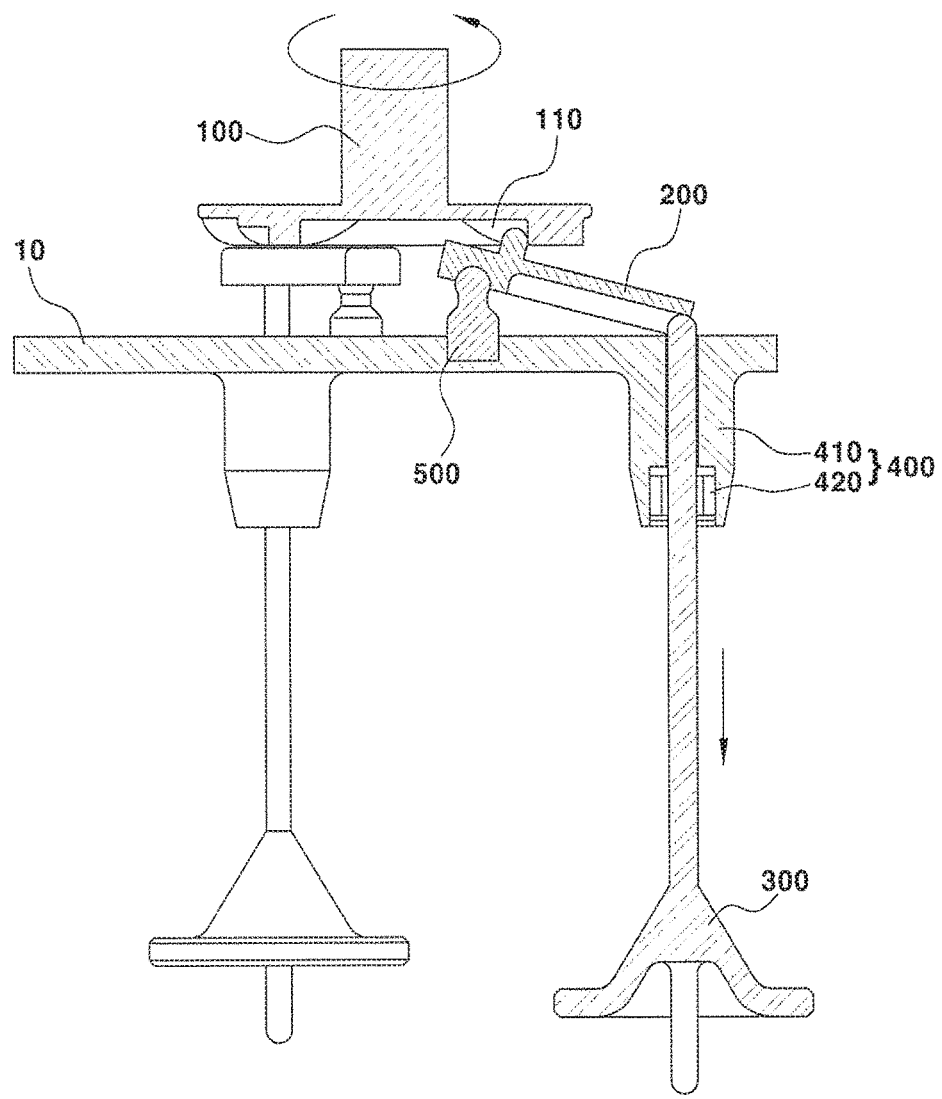
FIG. 6 is a view showing a state of operation of a coolant control valve according to an embodiment of the present disclosure.
Figure 7:
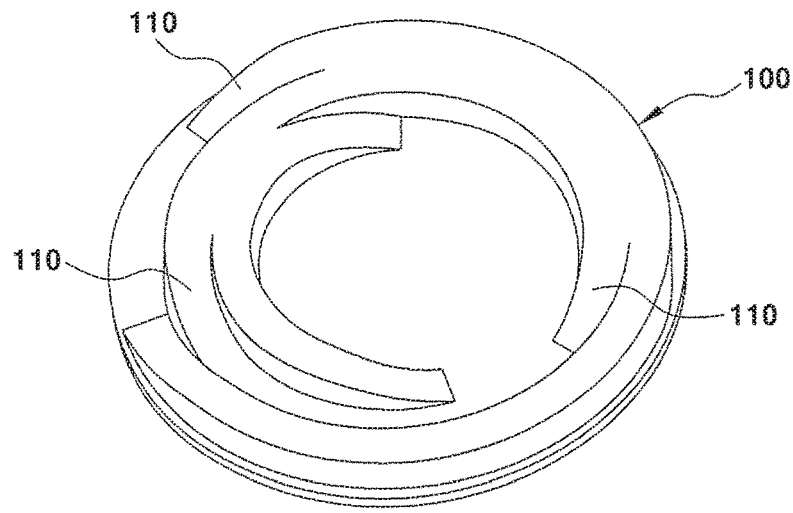
FIG. 7 is a view showing a cam of a coolant control valve according to an embodiment of the present disclosure.

Referring to FIGS. 6 and 7 hereinafter, FIG. 6 is a view showing a state of operation of a coolant control valve according to an embodiment of the present disclosure, and FIG. 7 is a view showing a cam part of a coolant control valve according to an embodiment of the present disclosure.

Referring to FIG. 6, operation of the coolant control valve according to this embodiment will be described below.

First, when the cam part 100 is rotated by a driving means (not shown), one end of the pivot arm part 200 disposed under the cam part 100 lifts and descends along a vertical direction.

That is, the slope 110 is formed under the cam part 100 with the same number as that of the pivot arm parts 200 as shown in FIG. 1 wherein the slant surface of the slope 110 presses the pivot arm part 200, i.e., the protrusion 220 of the pivot arm part 200 as the cam 100 rotates so that one end of the pivot arm part 200 descends.

In this case, when the slant surface of the slope 110 presses the protrusion 220 as described above, one end of the body part 210 rotates pivotally in a direction of descending around the pivot arm support hinge 500, whereby the valve part 300 installed at the lower portion of the valve part 210 also descends through the valve guide 400.

This is to eliminate a shear force acting on the valve part 300 by the cam portion 100. In the prior art as shown in FIG. 1, the valve part 300 is positioned inside an outer diameter of the cam part 100 and the valve part 300 is configured to operate through tilting movement when the cam part 100 rotates.

However, in the conventional structure as described above, the valve part 300 may be damaged due to a shear force resulting from the tilting movement of the valve part 300 itself. Accordingly, in this embodiment of the present disclosure, the pivot arm part 200 and the pivot arm support hinge 500 are further provided such that the valve part 300 moves up and down in a state of being positioned outside the outer diameter of the cam part 100, whereby a shear force acting on the valve part 300 by operation of the cam part 100 is eliminated.

Figure 8:
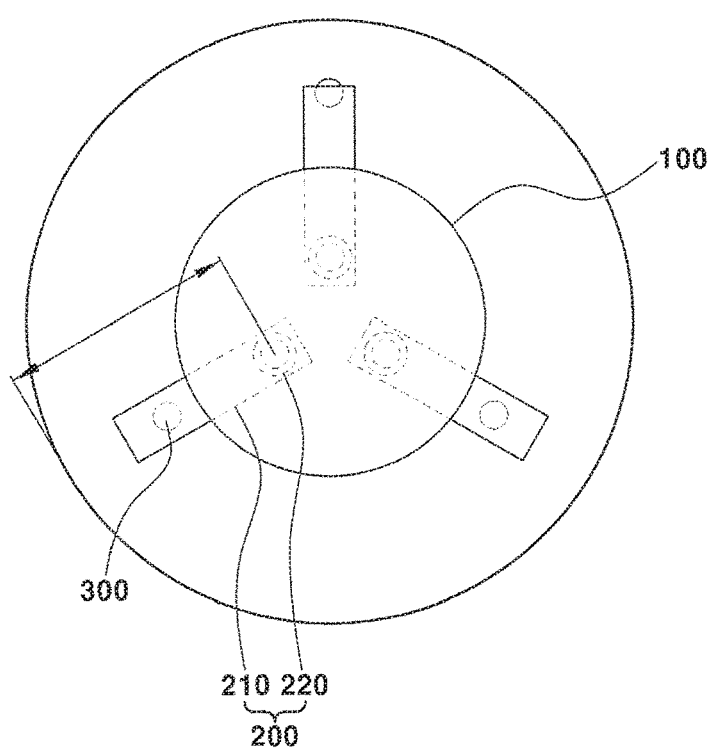
FIG. 8 is a view showing the installation of a pivot arm support hinge and a valve body of a coolant control valve according to an embodiment of the present disclosure.

FIG. 8 is a view showing position of installation of a pivot arm support hinge and a valve body of a coolant control valve according to an embodiment of the present disclosure.

As shown in FIG. 8, the coolant control valve according to this embodiment is positioned outside the cam part 100 and comprises the valve part 300 moving up and down as the pivot are part 200 moves up and down.

In this case, disposing the valve part 300 outside the outer diameter of the cam portion 100 can be made by adjusting the length of the pivot arm part 200.

That is, a plurality of pivot arm parts 200 are arranged radially under the cam part 100 and the protrusion 220 is pressed through the slant surface of the slope 110 as the cam part 100 rotates, and thus, one end of the body part 210 moves down, wherein if the length of the pivot arm part 200 is adjusted, position of the valve part 300 can also be shifted to the outside of the outer diameter of the cam part 100.

In other words, in the prior art, since there is no configuration such as the pivot arm portion 200 and the pivot arm support hinge 500 as in this embodiment and therefore the valve part 300 must be positioned inside the outer diameter of the cam part 100, not only the shear force is generated in the valve part 300 but also the position of installation of the valve part 300 cannot be adjusted.

Therefore, in this embodiment, since the pivot arm part 200 and the pivot arm support hinge 500 are provided and the valve part 300 is installed outside the outer diameter of the cam part 100 by adjusting the length of the pivot arm part 200 and hence moved up and down, it is possible to increase the degree of freedom of design according to a valve layout.

The present disclosure has an advantageous effect that since the pivot arm part and the pivot arm support hinge are provided between the cam part and the valve part so as to eliminate a shear force acting on the valve part by the cam part and at the same time length of the valve guide is increased so as to install the valve part outside the outer diameter of the cam part, it is possible to stabilize behavior of vertical movement of the valve part and improve leakage.

In addition, the present disclosure has a further advantageous effect that since the valve part is configured to follow the valve guide and move in the vertical direction only, it is possible to stabilize behavior of movement of the valve part and eliminate the shear force applied to the valve part as described above, thereby improving breakdown of the valve part.

Further, the present disclosure has also an advantageous effect that since lengths of the pivot arm part, the valve guide and the like can be adjusted such that the valve part is installed under the lower surface of the cam part, the degree of freedom of design according to a valve layout can be increased.

The present disclosure has been described in detail with reference to preferred embodiments illustrated in the drawings, but it is merely exemplary. It will be appreciated by those skilled in the art that various modifications can be made from the disclosure and the present disclosure can be implemented by selectively combining the entirety or some of the embodiments. Therefore, the true scope of the present disclosure should be defined by the spirit and scope of the appended claims.

What is claimed is:

1. A coolant control valve comprising:
   a cam rotating by rotational force;
   a pivot arm disposed under the cam, one end of the pivot arm moving in an up and down direction by the rotation of the cam;
   a valve installed at another end of the pivot arm and disposed outside an outer diameter of the cam, the valve being moved as the pivot arm moves; and
   a pivot arm support hinge supporting the pivot arm and enabling the up and down movement of the pivot arm when the cam rotates,
   wherein the cam comprises a slope on a lower surface of the cam,
   wherein the pivot arm comprises:
      a body; and
      a protrusion protruding from a top portion of the body and abut against a surface of the slope; and
      a guide rod formed on a lower portion of the body to guide movement of position of the valve, and
   wherein a plurality of pivot arms are disposed under the cam.

2. The coolant control valve of claim 1, further comprising a valve guide spaced apart from a lower portion of the pivot arm,
   wherein the valve guide allows the valve to pass through the inside the valve guide to guide lifting and descending of the valve.

3. The coolant control valve of claim 1, wherein the body comprises a mounting groove into which the pivot arm support hinge is inserted, and
   wherein the mounting groove guides the up and down movement of the pivot arm against the pivot arm support hinge when the protrusion is pressed by the rotation of the cam.

4. The coolant control valve of claim 3, wherein the mounting groove has a round shape corresponding to a shape of the pivot arm support hinge, and
   wherein an upper part of the pivot arm support hinge is fitted into and engaged with the mounting groove to allow the body to rotate pivotally.

5. The coolant control valve of claim 1, wherein at least one pivot arm is arranged radially under the cam, and
   wherein the slope presses the protrusion through the slant surface of the slope and allows one end of the body to descend as the cam rotates.

6. The coolant control valve of claim 2, further comprising a plate connecting the valve and the cam, and
   wherein the valve guide comprises:
      an installation guide on one side of the plate such that the valve is disposed outside the outer diameter of the cam and the up and down movement of the valve is supported; and
      a lip seal disposed inside the installation guide to interrupt formation of a gap between an inner surface of the installation guide and an outer surface of the valve.

* * * * *